Aug. 15, 1933.   F. RIEDEL   1,922,260
CIRCUIT MAKER
Filed May 22, 1930
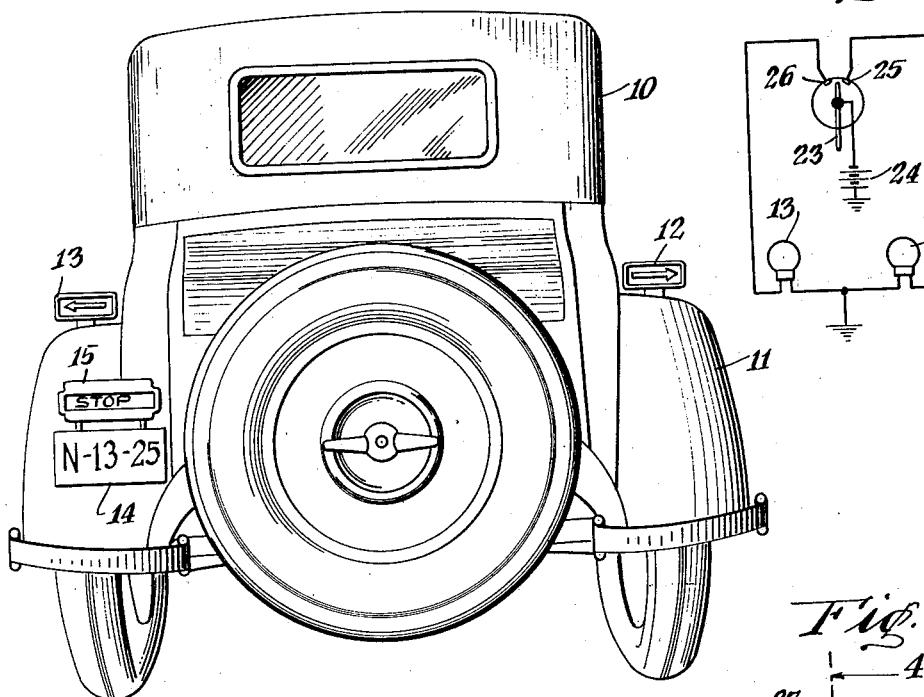
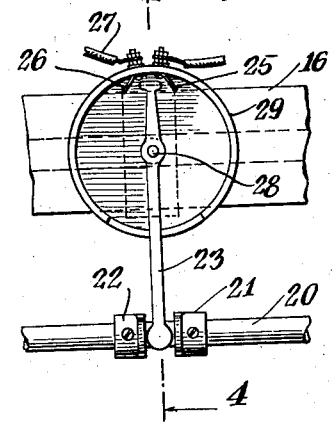
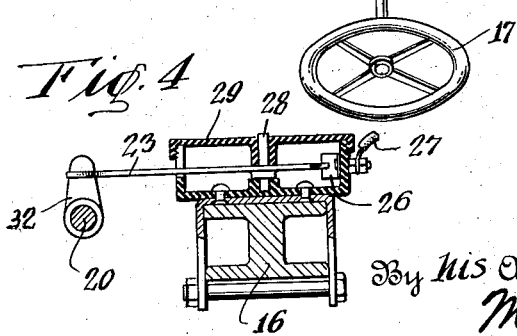
Inventor
Franz Riedel
By his Attorney Patented Aug. 15, 1933

1,922,260

UNITED STATES PATENT OFFICE 1,922,260

CIRCUIT MAKER

Franz Riedel, Long Island City, N. Y.

Application May 22, 1930. Serial No. 454,557

1 Claim. (Cl. 200—59)

This invention relates to improvements in direction signals for automobiles, and it is the principal object of my invention to provide a device of this character with a circuit maker operated simultaneously with the operation of the steering wheel for making a turn in one and the other direction, to illuminate the lamp indicating the direction of the turn to be made.

Another object of my invention is the provision of a circuit maker of simple and inexpensive construction which can be installed in any automobile at present in use without the necessity of making vital changes in its construction.

Still another object of my invention is the provision of a circuit maker for automobiles which is durable and efficient in its operation.

These and other objects and advantages of my invention will become more fully known as the description thereof proceeds and will then be specifically defined in the appended claim.

In the accompanying drawing forming a material part of this disclosure:

Fig. 1 is a rear view of an automobile equipped with a circuit maker constructed according to my invention.

Fig. 2 is a top plan view of the front axle of the car equipped with a switch.

Fig. 3 shows the switch of the circuit maker on an enlarged scale.

Fig. 4 is a section on line 4—4 of Figure 3.

Fig. 5 is a diagrammatic view of the electric circuit.

As illustrated, an automobile 10 of any known type has the mud-guards 11 of its rear wheels equipped with lamps 12, 13 bearing arrows pointed in opposite directions and above its license plate 14 a lamp 15 having its glass bearing the inscription "Stop".

The front axle 16 of the car is connected to the steering wheel 17 by the usual connection generally designated 18, 19, including the connecting operating rod 20 for the wheels.

This rod 20 carries intermediate its ends collars 21, 22 spaced from one another and having upwardly extending lugs 21'—21' between which extends the outer end of a switch lever 23 connected to a battery 24.

The inner end of the lever 23 is adapted to make alternately contact with contacts 25, 26, each connected by cables 27 to the lamps 12 and 13 respectively. The lever 23 is pivoted intermediate its ends as at 28 to the axle 16 within a housing 29 bolted to the axle 16.

The operation of my device will be entirely clear from the above description and by simultaneous inspection of the drawing, and it will be evident that by steering the vehicle in the usual manner, the displacement of rod 20 in one or the other direction will operate by the intermediary of collars 21, 22 the switch lever 23 to close circuits over contacts 25 or 26 respectively to illuminate one or the other of the lamps 12, 13 so that the arrow thereon will indicate the direction of an intended turn.

It will be understood that I have described and shown only one example of the many possible ways to practically construct my signaling device and that I may make such changes therein, as come within the scope of the appended claim without departure from my invention.

Having thus described my invention, what I claim as new and desire to secure by Letters Patent is:

In an automatic circuit maker for vehicle signal lamps, the combination with the front axle and tie rod connecting the steering knuckles, an enclosed cylindrical housing of insulating material fixed on said front axle, a pair of spaced electrical contacts in said housing, one for each signal lamp, a bar pivoted on the axis of said housing having one end adapted to engage either of said contacts and the other end extending outwardly through the wall of the housing, said bar being in the electric circuit, a pair of opposed collars each independently adjustable on said tie rod, and lugs extending upwardly from the adjacent sides of said collars having between them the extending end of said lever.

FRANZ RIEDEL.